March 26, 1963

B. H. SMITH 3,083,359

RELAYS WITH INDICATOR

Filed March 9, 1961

INVENTOR.
BENJAMIN H. SMITH
BY
Peter J. Patane
HIS ATTORNEY.

March 26, 1963  B. H. SMITH  3,083,359
RELAYS WITH INDICATOR
Filed March 9, 1961  2 Sheets-Sheet 2

INVENTOR.
BENJAMIN H. SMITH
BY
Peter J. Patane
HIS ATTORNEY.

United States Patent Office 3,083,359
Patented Mar. 26, 1963

3,083,359
RELAYS WITH INDICATOR
Benjamin H. Smith, Bloomfield, N.J., assignor to Heinemann Electric Company, Trenton, N.J., a corporation of New Jersey
Filed Mar. 9, 1961, Ser. No. 94,614
4 Claims. (Cl. 340—376)

This invention relates to electromagnetic devices and more particularly to electromagnetic devices having a visual signal for indicating that operation of the device has taken place. It is an object of the present invention to provide improved structures of the foregoing type.

Another object of the invention is to provide a visual indicating device comprising a minimum number of parts and which is economical to utilize in the electromagnetic device, when it is desired.

By use of such a signal device, when a number of such electromagnetic devices are utilized, the operator will readily be informed of which one of the electromagnetic devices has been actuated without the need for inspection of all of the circuits.

One embodiment of my invention is incorporated in an electromagnetic relay structure comprising a coil and a pivotal armature (supported by a frame) having an insulator arm for separating a pair of contacts, which are biased to the closed position, upon predetermined energization of the coil. The arm has an extension which cooperates with a visual indicator that is in sliding relation with a fixed base. The indicator is biased by a spring to the indicating position but restrained from moving to the indicating position by the arm. When the armature is pivoted, the extension of the arm pivots out of restraining engagement with the indicator and the latter moves to the visual indicator position.

The indicator is slidably keyed with the base and is provided with a portion which engages the arm after the indicator travels a certain distance. This travel is limited so that the indicator does not separate itself from the base. Also, the indicator is shaped with a cam surface which is high enough to prevent the arm, and consequently the armature, from returning to the original position upon subsequent deenergization of the coil, whereby the contacts are maintained open until the relay is reset by depressing the indicator.

Alternatively, in another embodiment, the cam surface is depressed sufficiently to allow the arm and the armature to return to its position before the coil was energized, upon deenergization of the coil, whereby the contacts return to the closed position. On the other hand, the cam surface is made low enough so that when the indicator is reset manually the consequent pivoting of the arm is not sufficient to actuate the movable contact.

The foregoing and other objects of the invention, the principles of the invention, and the best modes in which it is contemplated applying such principles will more fully appear from the following description and accompanying drawings in illustration thereof.

Figure 1:
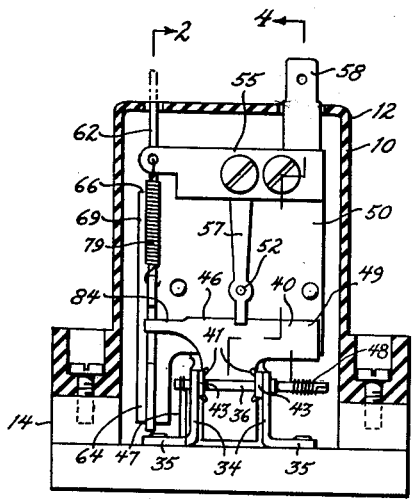
FIG. 1 is an elevation, partly in section, illustrating the invention incorporated in an electromagnetic relay prior to energization of the relay coil.
Figure 2:
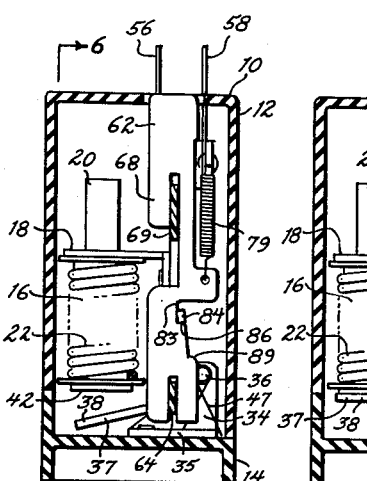
FIG. 2 is an elevation, partly in section, viewed along the line 2—2 in FIG. 1, illustrating the position of the visual indicating device prior to energization of the relay coil.
Figure 3:
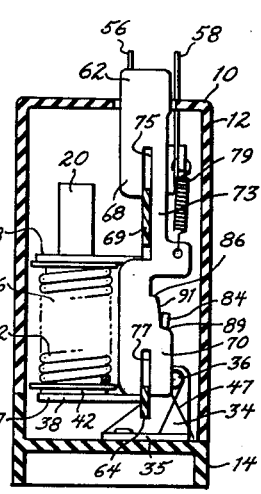
FIG. 3 is a view similar to FIG. 2 but illustrating the position of the visual indicating device after energization of the coil.
Figure 6:
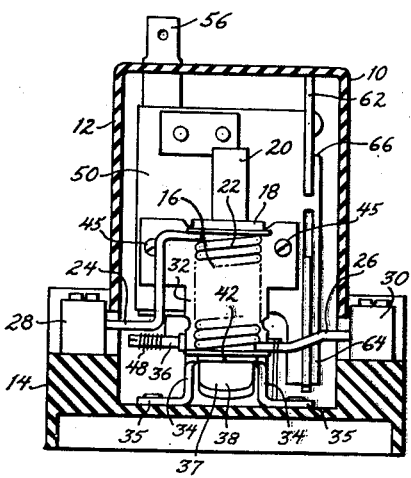
FIG. 6 is an elevation, partly in section, taken along the line 6—6 in FIG. 2.
Figure 8:
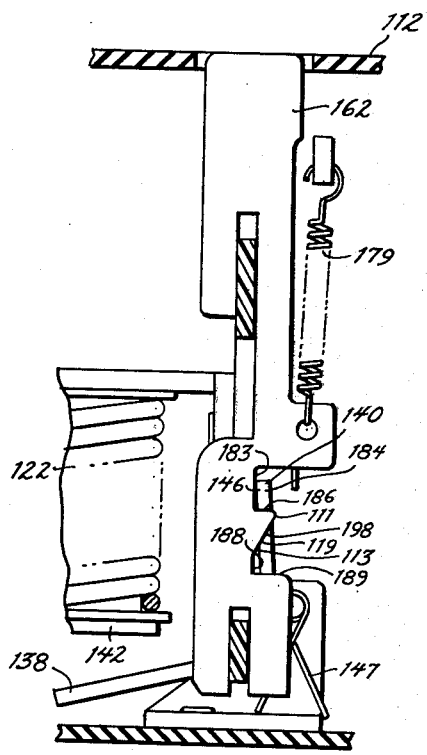
Figure 9:
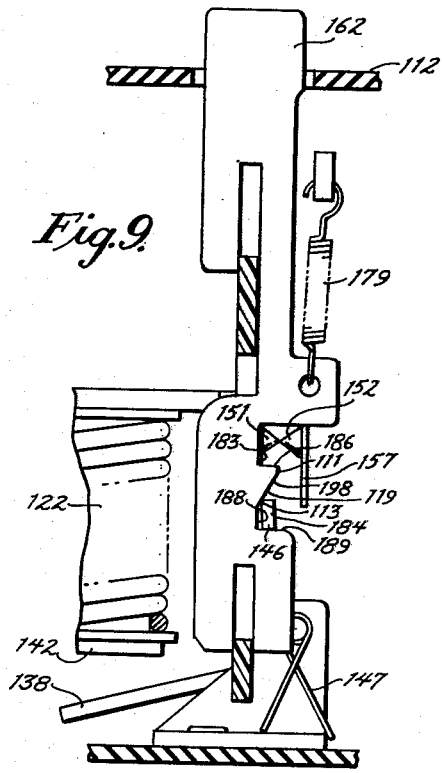
Figure 7:
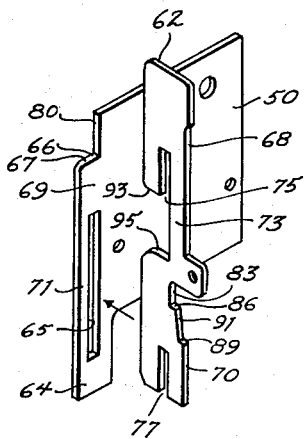

FIG. 7 is a partial exploded view of the relay illustrated in FIGS. 1 to 6 illustrating only the contact base and the visual indicating device; and FIGS. 8 and 9 are fragmentary views showing a modified visual indicating device in FIG. 8 before energization of the coil and in FIG. 9 after energization of the coil and actuation of the visual indicating device and subsequent deenergization, the views being similar to FIGS. 2 and 3.

Referring to the drawings, there is illustrated an electromagnetic relay enclosed by an insulating case 10 including a cover 12 suitably secured to a base 14. Mounted upon the insulating base is an electromagnet 16 comprising a frame 18 supporting a tube 20 of nonmagnetic material and an electromagnetic solenoid coil 22. The coil 22 has two end portions 24 and 26 connected to two terminals 28 and 30, respectively, to which may be connected external circuit components.

The frame 18 is formed from magnetically permeable material and includes an L-shaped body 31 and a lower portion bent to a channel shape to provide opposed flanges 34 and laterally extending feet 35 suitably secured to the base 14, a pintle 36 extending through openings in the flanges 34 for pivotally securing thereto an L-shaped armature 38. Rotatable with the armature 38 is an insulator arm 40 wedged against the vertical armature leg 39 by peening, as at 41, against the surface of the insulator arm 40 some of the edge material of the opposed surfaces of the ears 43 formed integral with the vertical armature leg 39.

The pintle 36 is maintained stationary by a spring 47 which is tightly wrapped about one end of the pintle extending beyond the left hand flange 34, FIG. 1, and which has its ends crossed and held apart, FIG. 3, by having one end lodged in a groove in the left foot 35 and the other end engaging an edge of the same foot. Another spring 48, FIG. 1, biases the armature 38 counterclockwise, as viewed in FIG. 2, by having one end engage a right hand extension 49 of the insulator arm 40 and the other end of the spring in a suitable notch in the pintle 36.

Figure 4:
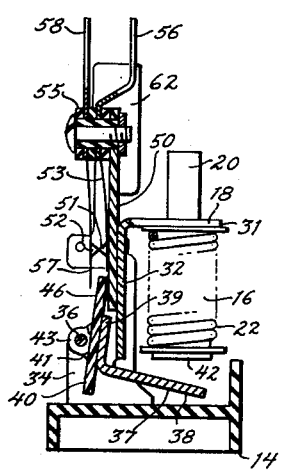
FIG. 4 is a sectional view, taken along the line 4—4 in FIG. 1, partly in elevation, illustrating the position of the visual indicating device in the same position as FIG. 2 but omitting the cover.
Figure 5:
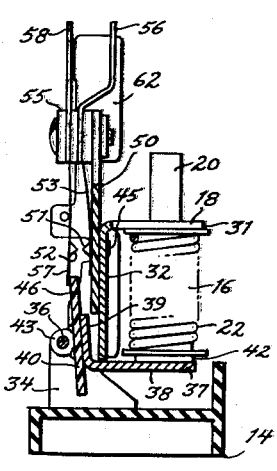
FIG. 5 is a view similar to FIG. 4 but illustrating the position of the visual indicating device corresponding to FIG. 3.

Predetermined energization of the coil 22 actuates the armature 38, either instantaneously or after a time delay period if the tube 20 is provided with a time delay element, by pivoting the armature 38 clockwise, as viewed in FIGS. 2 and 3, so that the generally horizontal armature leg 37 moves toward and abuts the pole piece 42, against the bias of the spring 48 which biases the upper part 46, FIG. 4, of the insulator arm 40, in its extreme clockwise position, against the insulator contact supporting base 50 secured by screws 45 to the vertical leg 32 of frame 31.

Stationary contact 51 is secured to a stationary conducting strip 53 which abuts against the contact base 50 and which is secured in a suitable stack 55 of insulators and connected to a terminal 56. Similarly, movable contact 52 is secured to a movable conducting strip 57 which, however, provides a spring bias so that normally the contact 52 is biased into engagement with the contact 51, and the strip 57 is also connected to a terminal 58 secured in the stack 55 by suitable screws, suitably insulated from the other members.

The strip 57 overlies but is spaced from the upper arm part 46, when the coil is deenergized or energized below predetermined current. When the coil is energized above predetermined currents, the armature leg 38 is pivoted toward the pole piece 42 and through the distance separating the strip 55 and upper arm part 46, the part 46 engages the strip 57 and continued movement thereof separates the contacts 51 and 52 by movement of the strip 57 against its spring bias, the movement of the armature being sufficient to fully separate the contacts 51 and 52.

The insulator arm 40 has a lateral extension 84 which normally restrains movement of a visual, insulator signal device or indicator 62. The indicator 62 is in sliding, interfitting relation with an extension 64 of the contact base 50, the base extension 64 extending laterally to one side of the vertical frame leg 32 and alongside the left hand flange, FIG. 1, defining an elongated slot 65 and notch 66 having a shoulder 67.

The indicator 62 comprises two sections in cruciform, interfitting and sliding relation with corresponding parts of the base extension 64, namely an upper indicator section 68 cooperating with an upper base extension section 69 and a lower indicator section 70 cooperating with a lower base extension section 71. The upper and lower indicator sections 68 and 70, however, are connected by a midportion 73 on one side only of the extension 64.

The upper indicator section 68 has an elongated open ended slot 75, at approximately its middle, as illustrated, for receiving the part of the upper base extension section 69 below the shoulder 67. Likewise, another elongated open ended slot 77 is provided, aligned with slot 75, for receiving the part of the lower base extension section 71, below the slot 65, all of which is illustrated in FIG. 2. The wall 80, defining with shoulder 67 the notch 66, is aligned with the right hand wall defining the slot 65, FIG. 7.

The indicator 62 is biased upwardly as viewed in the drawings by a spring 79 having an end secured to one of the insulators of the stack 55 and the other end secured to projection of the midportion 73.

When the coil 22 is deenergized or energized below a predetermined current level, the indicator 62 is restrained, so that its upper edge portion does not extend beyond the case cover 12, by the extension stop 84 (of the arm 40) which is biased into the recess 83 and engages the horizontal shoulder abutment 86. When the coil is energized above a predetermined current level the armature is attracted (either instantaneously or after a time delay period) and moves sufficiently toward the pole piece 42 for the insulator arm 40 to lift movable strip 57 and contact 52 from contact 51 and substantially simultaneously the shoulder 86 is released by the extension 84 at which time the upper end of the indicator 62 moves out of the case and extends above the cover 12 and becomes readily visible to an observer, FIG. 3. Movement upwardly of the indicator 62, however, is again limited by the extension 84 which (when the armature has rotated its full amount and engages the pole piece 42) engages a second, lower shoulder abutment 89. Between the shoulders 86 and 89 an inclined surface 91 is provided which is sufficiently spaced from the surface of the contact base 50 to prevent or lock the armature from returning sufficiently toward the position obtaining prior to its actuation (even though the current in the coil 22 should return to the level wherein the armature 38 would be otherwise released) due to the spring bias, to prevent the movable contact 52 from engaging the stationary contact 51. The indicator 62 will remain in this locked position, with the extension 84 bearing upon surface 91 (due to the spring bias on the armature) until the indicator is manually reset by depressing the upper end extending through and above the cover, against the bias of spring 79 until the arm 84 enters recess 83. Manual movement downward of the indicator 62 is limited by making the lower end of the indicator long enough to contact the left foot 35 after the indicator 62 moves down sufficiently to allow extension 84 to enter the recess 83, at which time the upper end of the indicator is no longer visible outside the cover, the slots 77 and 75 being long enough not to engage the contact base extension 64 before the lower end of the indicator 62 strikes the left foot 35.

The shoulder 89 is positioned so that at the maximum upward movement of the indicator the lower portions of the slots 75 and 77 are still in interfitting relation with portions of the extensions 69 and 71, as viewed in FIG. 3.

The slot 65 is made slightly longer than the lower indicator section 70 and the space defined by the midportion 73 and the opposed walls 93 and 95 is made slightly larger than the distance between the upper end of slot 76 and the horizontal shoulder 67 so that the two parts may be assembled by fitting one into the other by movement relative to each other as indicated in FIG. 7. When the indicator is about midway in the slot 65, the indicator is lowered, relative to the base extension 64, whereby the slots 75 and 77 of the indicator are engaged by the base extension 64.

The modification illustrated in FIGS. 8 and 9 allows the armature 138 to pivot to its original position existing before actuation by the coil 122 when the coil is deenergized or energized below a predetermined level. This is accomplished by providing a cam surface 198 defining a recess 183 and a shoulder 186 similar to those provided for the relay of FIGS. 1 to 7. The cam surface 198 further includes an inclined surface 119 having a high surface 111 which decreases downwardly to a low surface 113 forming with shoulder 189 a second recess 188 aligned with the recess 183. As was mentioned in connection with FIGS. 1 to 7, the upper arm part 146 is spaced from the movable contact strip 157.

As in the previous embodiment, the armature 138 is spring biased so that the extension arm 184 is biased toward the cam surface 198 at all times. When the coil 122 attracts the armature 138, the armature is pivoted a distance sufficient to fully separate the contacts 151 and 152 and become disengaged from the shoulder 186. The shoulder 186 and high surface 111, extend to the right far enough to restrain movement of the indicator 162 by engagement with arm 184, when the armature is not attracted toward the pole piece 142. The dimension of the shoulder 186 and high surface 111 are such, however, that the arm 184 and hence, upper arm part 146 are lifted through only part of the distance between it and the movable strip 157, the distance existing between these parts prior to actuation of the armature 138 by the coil 122.

Consequently, when the indicator 162 is reset manually, by depressing the upper end of the indicator 162 against the bias of spring 179 until the uppermost edge of the indicator 162 is flush with the cover surface, the armature will be pivoted clockwise by the inclined surface 119, as the indicator moves downwardly, and the arm 184 will be lifted out of the lower recess 188 and allowed to return to the upper recess 183 due to the fact that the shoulder 186 passes below the arm 184 at this time. But this pivotal movement of the armature 138 and insulator arm 140 is insufficient to actuate the movable contact strip 157, hence, the circuit which the contacts 151 and 152 control is not effected by this movement.

In FIGS. 8 and 9, the parts corresponding to those described in connection with FIGS. 1 to 7 inclusive have been indicated by numerals which are 100 higher than those used in connection with FIGS. 1 to 7.

Having described the invention, I claim:

1. An improved electromagnetic signal device comprising a coil, a pivotal armature movable upon a predetermined current condition in said coil from a first position to a second position, a reciprocable indicator, a fixed base, a mounting structure secured to said base and slidably receiving a portion of said indicator whereby the indicator is slidably movable back and forth between a first position and a second position, a spring biasing said indicator toward said second position, a pivotal stop movable by said armature from a first position to a second position; said armature, said stop and said indicator being positioned jointly in their first positions; a second spring biasing said stop toward said indicator, a first abutment on said indicator engageable with said stop to restrain movement of said indicator toward its second position when said stop and said indicator are in their first positions, a second abutment on said indicator, said second abutment being spaced from the first abutment by the amount of slidable movement of said indicator desired between the latter's first and second positions, movement of said stop by said armature from said stop's first position to its second position being against the bias of said first mentioned spring and sufficient to disengage said stop from said first abutment, whereby said indicator slides toward its second position under the bias of the first mentioned spring, movement of said stop to its second position placing it in the path of movement of said second abutment, whereby said stop engages said second abutment to thereby define the second position of said indicator by limiting movement of the latter.

2. The structure recited in claim 1 wherein a wall is provided intermediate the first and second abutments positioned with respect to the second abutment and the pivotal movement of the stop to maintain said stop, and consequently said armature, in their second positions (to which they move on predetermined current) until said indicator is moved to its first position from its second position.

3. The structure recited in claim 1 wherein said first and second abutments are connected by a cam surface formed to provide a recess jointly with said second abutment, said recess being proportioned relative to the first position of said stop so that when said armature is actuated on predetermined current and said stop and indicator both move to their second positions, said recess provides a space into which said stop may move to assume its first position while retaining said indicator in its second position due to continued engagement between said stop and said second abutment, said indicator being movable from its second position toward its first position whereupon said stop rides on said cam surface out of said recess and into engagement with said first abutment until said stop and indicator assume their first positions.

4. The structure recited in claim 1 wherein said mounting structure is formed by an interfitting cruciform arrangement of portions of said indicator and said base provided by an open ended slot in either said indicator or said base and a closed slot in the other, said indicator and said base being assembled together so that a portion of one is received by the slot of the other during all movement between the first and second positions of said indicator.

References Cited in the file of this patent
UNITED STATES PATENTS

| | | |
|---|---|---|
| 988,004 | Lungren | Mar. 28, 1911 |
| 2,200,109 | Wilckins | May 7, 1940 |
| 2,408,106 | Stearn | Sept. 24, 1946 |
| 2,427,998 | Wilckins | Sept. 23, 1947 |